US005847540A

United States Patent [19]

Burns et al.

[11] Patent Number: 5,847,540

[45] Date of Patent: Dec. 8, 1998

[54] RECHARGEABLE FLASHLIGHT WITH MULTI-POSITION AC PLUG UNIT THAT CONTROLS LOAD CIRCUIT AND CHARGING CIRCUIT CONNECTIONS AND VISUAL INDICATOR

[75] Inventors: Bruce Burns, Portland, Oreg.; Chan Kwok Ying, Sheung Shui, Hong Kong

[73] Assignee: Burns Bros., Inc., Portland, Oreg.

[21] Appl. No.: 910,106

[22] Filed: Aug. 13, 1997

[51] Int. Cl.[6] .................... H01M 10/46

[52] U.S. Cl. .................... 320/107

[58] Field of Search .................... 320/107, 111, 320/113, 114, 115, 101

[56] References Cited

U.S. PATENT DOCUMENTS

| | | | |
|---|---|---|---|
| 3,027,507 | 3/1962 | Hübner | 320/2 |
| 3,458,794 | 7/1969 | Bohnstedt et al. | 320/2 |
| 3,825,740 | 7/1974 | Friedman et al. | 240/10.6 |
| 3,890,555 | 6/1975 | Nelson et al. | 320/2 |
| 4,177,500 | 12/1979 | Nicholl et al. | 362/20 |
| 4,244,011 | 1/1981 | Hammel et al. | 362/183 |
| 4,398,139 | 8/1983 | Prinsze | 320/2 |
| 4,412,168 | 10/1983 | Sell | 320/48 |
| 4,467,263 | 8/1984 | Conforti et al. | 320/2 |
| 4,563,629 | 1/1986 | Keiper | 320/48 |
| 4,647,832 | 3/1987 | Fenne et al. | 320/2 |
| 4,743,829 | 5/1988 | Fenne et al. | 320/2 |
| 4,758,772 | 7/1988 | Lang | 320/48 |
| 4,794,315 | 12/1988 | Pederson et al. | 320/2 |
| 4,829,290 | 5/1989 | Ford | 340/663 |
| 4,914,555 | 4/1990 | Gammache | 362/183 |
| 5,006,779 | 4/1991 | Fenne et al. | 320/2 |
| 5,013,972 | 5/1991 | Malkieli et al. | 315/209 |
| 5,293,156 | 3/1994 | Shoji et al. | 340/636 |

*Primary Examiner*—Edward Tso
*Attorney, Agent, or Firm*—Shapiro and Shapiro

[57] ABSTRACT

A rechargeable flashlight has a plug unit supported in the flashlight housing for rotation between a non-charging position, in which blades of the plug unit are retracted into the housing, and a charging position, in which the blades are projected from the housing for insertion in an AC outlet. The plug unit cooperates with a switch unit in the housing for connecting a rechargeable battery to a bulb circuit and disconnecting the battery from a charging and indicating circuit when the plug unit is in the non-charging position, and for disconnecting the battery from the bulb circuit and connecting the battery to the charging and indicating circuit when the plug unit is in the charging position. The charging and indicating circuit has a visual indicator that is energized repetitively when the plug unit is turned from the non-charging position but with the blades not inserted in a live AC outlet, and which is energized continuously when the blades are inserted in a live AC outlet. The visual indicator is de-energized when the plug unit is in the non-charging position.

19 Claims, 7 Drawing Sheets

RECHARGEABLE FLASHLIGHT WITH MULTI-POSITION AC PLUG UNIT THAT CONTROLS LOAD CIRCUIT AND CHARGING CIRCUIT CONNECTIONS AND VISUAL INDICATOR

BACKGROUND OF THE INVENTION

This invention is concerned with apparatus in which a rechargeable battery is arranged to supply power to a load and to be charged from an AC outlet. More particularly, the invention is concerned with a rechargeable flashlight with a multi-position AC plug unit that controls load circuit and charging circuit connections and that controls conditions of a visual indicator.

Rechargeable flashlights are known in which a multi-position AC plug unit controls load and charging circuit connections. Rechargeable flashlights are also known in which a visual indicator informs a user that a flashlight is charging. The present invention improves upon prior rechargeable flashlights having the foregoing features.

BRIEF DESCRIPTION OF THE INVENTION

In accordance with one aspect of the present invention, an AC plug unit is supported in a housing for movement between a non-charging position, in which blades of the plug unit are retracted into the housing, and a charging position, in which the blades are projected from the housing for insertion in an AC outlet. The plug unit cooperates with a switch unit in the housing to control connections between a rechargeable battery and a load circuit and between the rechargeable battery and a charging and indicating circuit.

In accordance with another aspect of the invention, a visual indicator has different energizing conditions depending upon the positions of the plug unit and whether AC power is supplied. More particularly, the visual indicator is energized repetitively when the plug unit is in the charging position but AC power is not supplied, is energized continuously when the battery is being charged, and is de-energized when the plug unit is in the non-charging position.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

The invention will be described in its preferred application to a rechargeable flashlight, shown generally in FIG. 1, but the invention may be used in other types of apparatus including a rechargeable battery for supplying power to a load.

Figure 3:
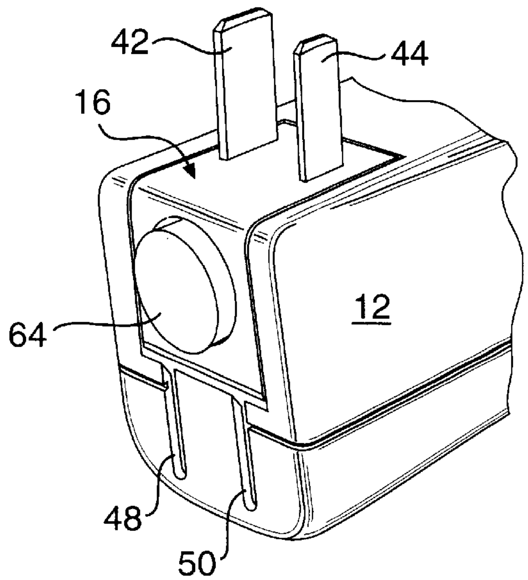
FIG. 3 is a similar fragmentary perspective view of the rechargeable flashlight, with the plug unit in the charging position.

The rechargeable flashlight 10 has a housing 12 with a head 14 at the front end, containing a conventional reflector and bulb unit (not shown), and with a plug unit 16 at the rear end. The plug unit is supported on the housing for pivotal movement between a non-charging position (FIG. 1) and a charging position (FIG. 3). The housing contains a rechargeable battery and a switch unit for connecting the battery to a load circuit including the bulb, or to a charging and indicating circuit, alternatively, as described later. A push button switch 18 is toggled by successive pressing to turn the bulb on and off when the plug unit is in the non-charging position.

Figure 15:
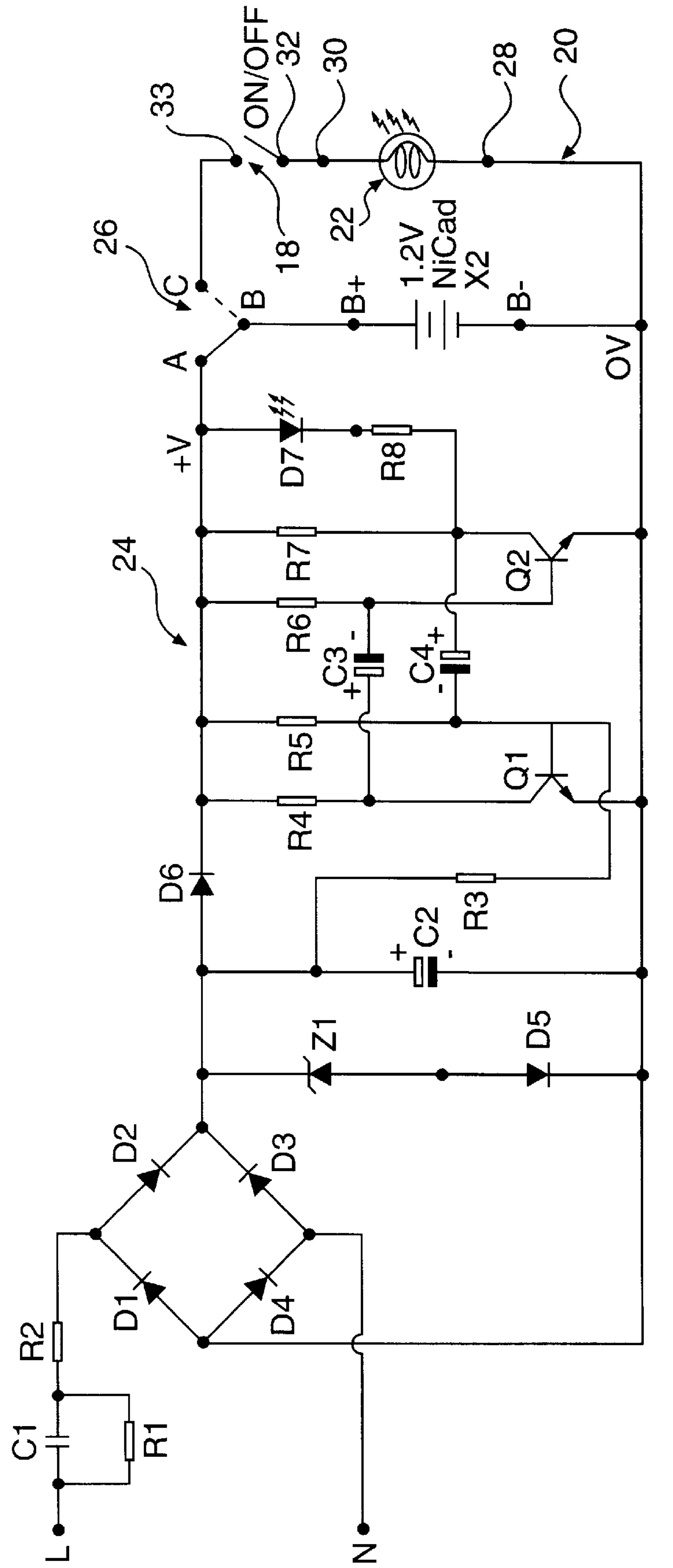
FIG. 15 is a diagram of circuitry employed in the rechargeable flashlight.

As shown in FIG. 15, circuitry contained within the housing 12 comprises a load circuit 20 including the bulb 22 and the on/off switch 18, and a charging and indicating circuit 24. A switch unit 26 cooperates with the plug unit for controlling connection of the rechargeable battery X2 to the load circuit or the charging and indicating circuit, alternatively.

The charging and indicating circuit includes diodes D1–D4 in a full-wave bridge rectifier that is supplied with AC from input terminals L and N, via capacitor C1 and resistors R1 and R2, and that supplies DC to the remainder of the charging and indicating circuit, which includes a zener diode Z1, diodes D5 and D6, capacitors C2–C4, resistors R3–R8, transistors Q1 and Q2, and a LED D7. As later described, terminals L and N are connected to blades of the plug unit 16 only when the plug unit is in the charging position.

When the plug unit 16 is in the charging position, the switch unit 26 is in the full-line position shown in FIG. 15, so that common terminal B of the switch unit is connected to terminal A of the switch unit, whereby the terminal B+ of the battery X2 is connected to output terminal +V of the charging and indicating circuit 24 and is disconnected from the load circuit 20. The terminal B− of the battery is permanently connected to the output terminal 0V of the charging and indicating circuit 24 and to terminal 28 of the bulb. The other terminal, 30, of the bulb is connected to the terminal 32 of the on/off switch 18. Terminal 33 of the on/off switch 18 is connected to terminal C of the switch unit 26.

When the plug unit is inserted into an AC outlet and supplied with AC power, the full-wave bridge rectifier D1–D4 charges the battery through the diode D6, voltage regulation being provided by the zener diode Z1 and the diode D5. The capacitor C2 is also charged.

When the plug unit 16 is in the non-charging position, the switch unit 26 is in the dash-line position shown in FIG. 15, disconnecting the battery terminal B+ from the output terminal +V of the charging and indicating circuit 24 and connecting the battery terminal B+ to the load circuit 20 via terminals B and C.

The charging and indicating circuit 24 includes a multivibrator constituted by the transistors Q1 and Q2, the capacitors C3 and C4, and the resistors R4–R7. An output of the multivibrator is connected to the LED D7 through the resistor R8, and an input to the multivibrator is connected to the capacitor C2 through the resistor R3.

Figure 1:
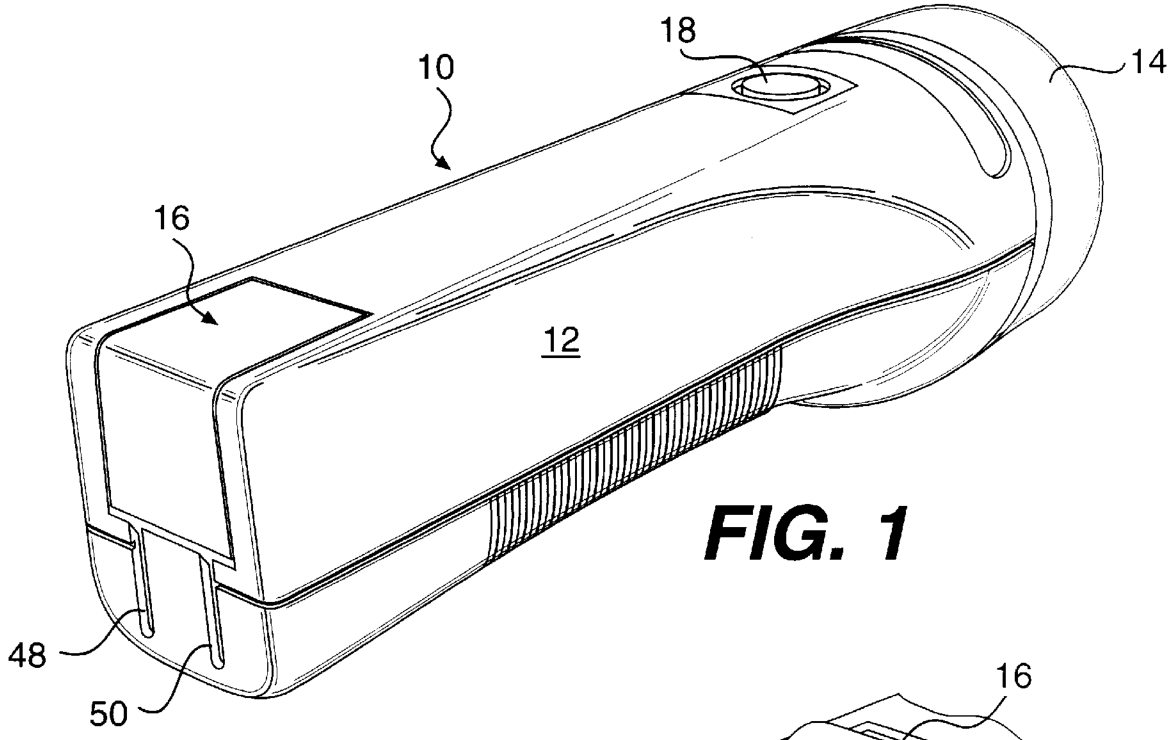
FIG. 1 is a perspective view of a rechargeable flashlight of the invention, with the plug unit in the non-charging position.
Figure 2:
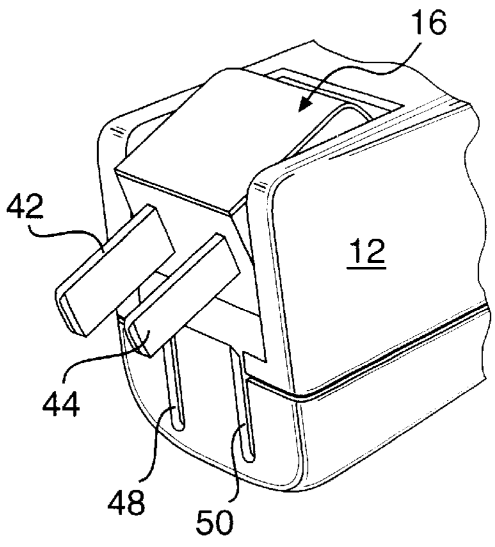
FIG. 2 is a fragmentary perspective view of the rechargeable flashlight, with the plug unit turned from the non-charging position toward the charging position.

When the plug unit 16 is turned from the non-charging position (FIG. 1), as shown in FIG. 2, or is turned to the charging position (FIG. 3) but without insertion of the blades 42 and 44 of the plug unit in a live AC outlet, the multivibrator oscillates freely, power thereto being supplied from the battery, and the LED D7 is energized repetitively, i.e., it blinks. If now the blades of the plug unit are inserted in a live AC outlet, the condenser C2 is charged and supplies a bias to the multivibrator circuit which stops the circuit from oscillating and causes the LED D7 to be energized continuously. When the plug unit 16 is in the non-charging position, the multivibrator is disconnected from the battery and the LED D7 is deenergized. Thus, by observing a visual indicator, i.e. the LED, the user can readily determine the condition of the circuitry, namely, whether the circuitry is prepared for bulb illumination or charging, or the battery is being charged.

Typical circuit values are: C1=1.5 $\mu$F; C2=47 $\mu$F; C3,C4=10 $\mu$F; R1=470 Ω; R2=10 Ω; R3=2.2 K; R4,R7=10 K; R5,R6=51 K; R8=120 Ω.

Figure 9:
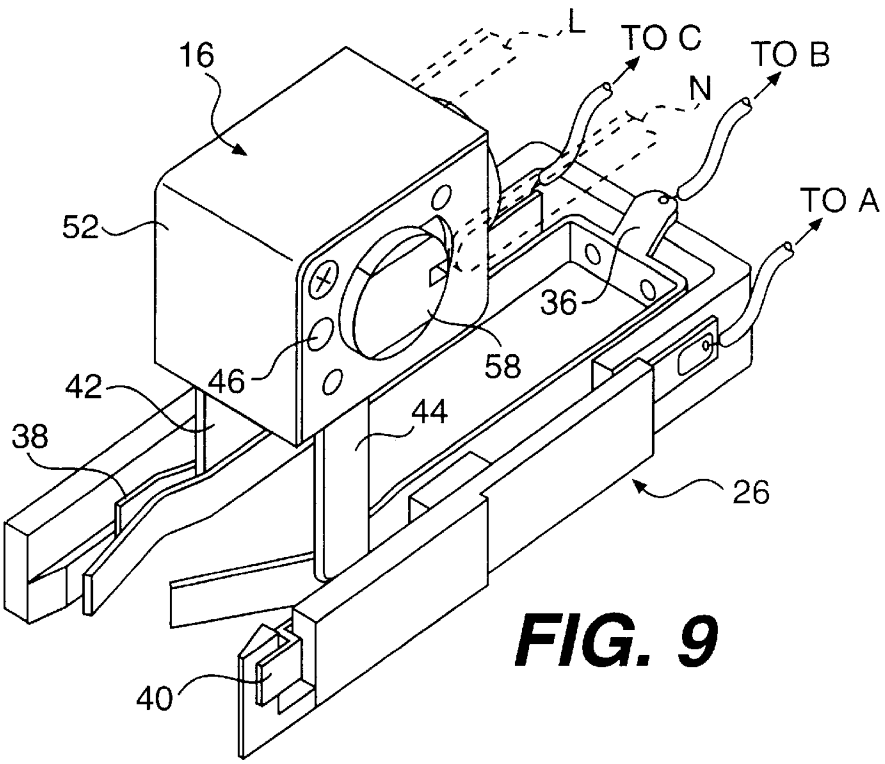
FIG. 9 is a perspective view showing the relationship of the plug unit and the switch unit when the plug unit is in the non-charging position.
Figure 10:
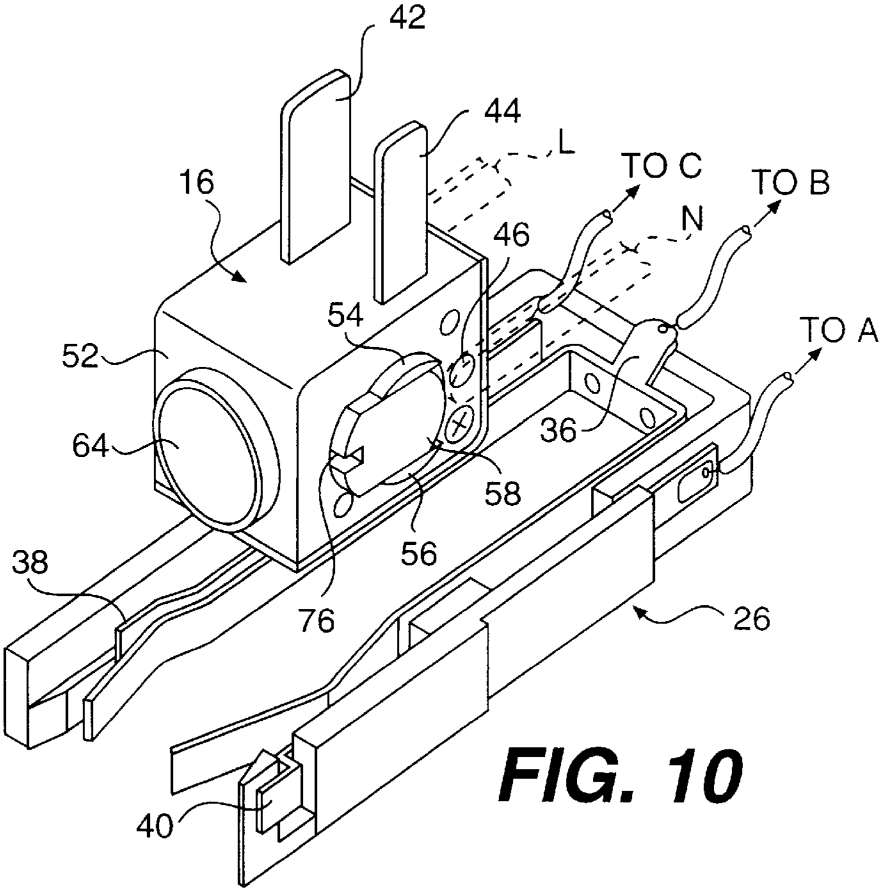
FIG. 10 is a perspective view showing the relationship of the plug unit and the switch unit when the plug unit is in the charging position.
Figure 11:
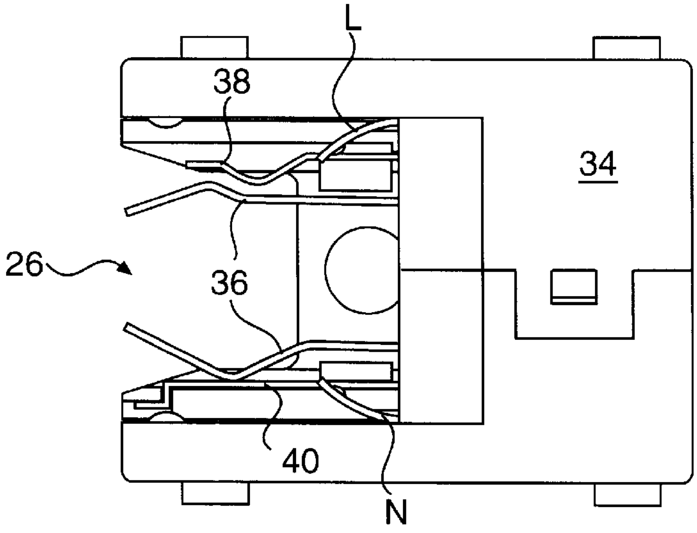
FIG. 11 is a plan view of the switch unit shown installed in a switch unit box.

The manner in which the plug unit 16 cooperates with the switch unit 26 is shown in FIGS. 7–11. As shown in FIG. 11, the switch unit 26 is mounted in a box 34 which is supported in the rear portion of the housing 12 along the bottom wall of the housing. As shown in FIGS. 9 and 10, the plug unit 16 is pivotally supported above the switch unit 26 (in a manner to be described). The switch unit 26 has a U-shaped common contact member 36, a normally open contact member 38 and a normally closed contact member 40. The common contact member and the normally open contact member provide a pair of normally open contacts, while the common contact member and the normally closed contact member provide a pair of normally closed contacts.

In the charging position of the plug unit 16 (FIG. 10) the normally open contact member 38 is disengaged from the common contact member 36, and the normally closed contact member 40 is engaged with the common contact member 36, so that the normally open contacts are open and the normally closed contacts are closed. See FIG. 8.

In the non-charging position of the plug unit 16 (FIG. 9), one blade, 42, of the plug unit is inserted between the common contact member 36 and the normally open contact member 38, engaging both of these contact members and providing a conductive path between the common contact member 36 and the normally open contact member 38. See FIG. 7. The other blade, 44, of the plug unit is inserted between the common contact member 36 and the normally closed contact member 40, moving the common contact member away from its normal engagement with the normally closed contact member 40 and opening the connection between the common contact member and the normally closed contact member. See FIG. 7. Thus, in the charging position of the plug unit 16 the normally closed contacts provide a connection between the battery and the charging and indicating circuit, while in the non-charging position of the plug unit the normally open contacts (now closed by a blade of the switch unit) provide a connection between the battery and the load circuit.

As shown in FIG. 10, contacts 46 on opposite sides of the plug unit 16 (only one such contact being shown in FIG. 10, but the other contact being identical) are positioned for respective engagement with contact members shown in dash lines and constituting the input terminals L and N of the charging and indicating circuit described previously in connection with FIG. 15. Internally of the plug unit 16, contacts 46 are electrically connected to respective blades 42 and 44. In the non-charging position of the plug unit shown in FIG. 9, contacts 46 are located away from contact members L and N, so that the blades 42 and 44 are disconnected from the input terminals of the charging and indicating circuit.

As shown in FIGS. 1–3, the blades 42 and 44 move through slots 48 and 50 in the rear wall of the housing 12 when the plug unit 16 is turned between its non-charging and charging positions. To turn the plug unit from the non-charging position shown in FIG. 1, the user presses inwardly on the front portion of the top wall of the plug unit, thereby turning the plug unit as shown in FIG. 2, whereupon the user grasps the blades 42 and 44 to continue turning the plug unit to the charging position shown in FIG. 3.

As shown in FIGS. 1–6, 9, and 10, the body 52 of the plug unit is preferably cube-shaped, with the blades protruding from one side (bottom) of the body. Arcuate protrusions 54 and 56 are formed externally on the opposite sides of the body on which the contacts 46 are located. Locking plates 58 are received between the arcuate protrusions. The protrusions 54 and 56 have opposed parallel edges that engage and guide opposite parallel edges of the locking plates 58 for reciprocation of the locking plates between non-locking and locking positions shown in FIGS. 9 and 10, respectively, and also shown in FIGS. 6 and 5, respectively. Depressions in the sidewalls may be provided to aid in the guidance. The locking plates also have opposite arcuate edges which complement the arcuate edges of the protrusions 54 and 56, so that when the locking plates are in the position shown in FIGS. 6 and 9, they form with the protrusions 54 and 56 a cylindrical pivotal bearing.

Figure 12:
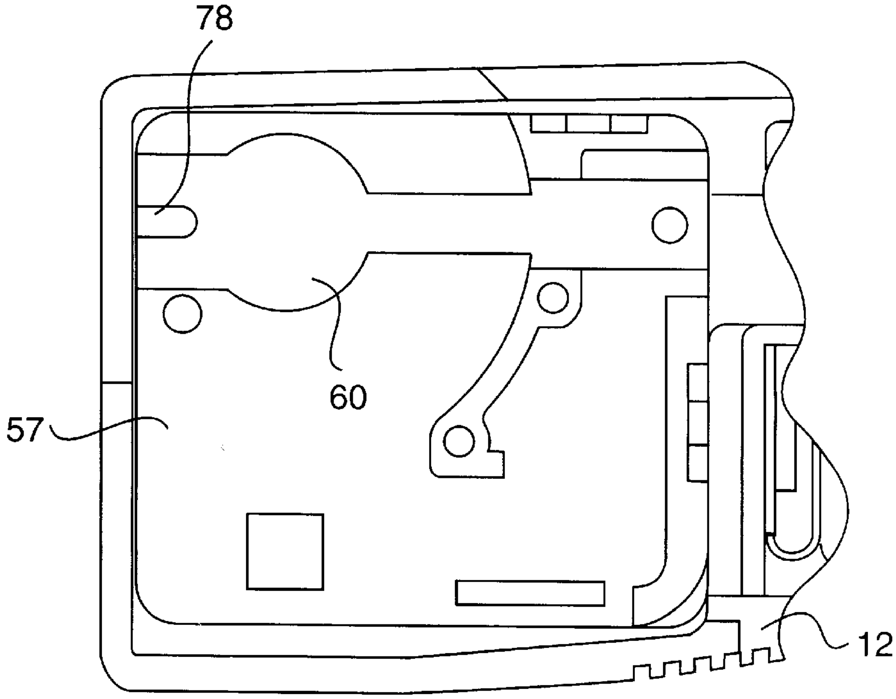
FIG. 12 is a fragmentary side elevation view showing the internal configuration of a wall of the switch unit box.

The box 34 shown in FIG. 11 has a pair of internal parallel sidewall surfaces 57, one of which is shown in FIG. 12. Each sidewall surface has an arcuate depression 60 for receiving a corresponding cylindrical pivot 54, 56, 58 of the plug unit, whereby the plug unit is supported pivotally.

Figure 4:
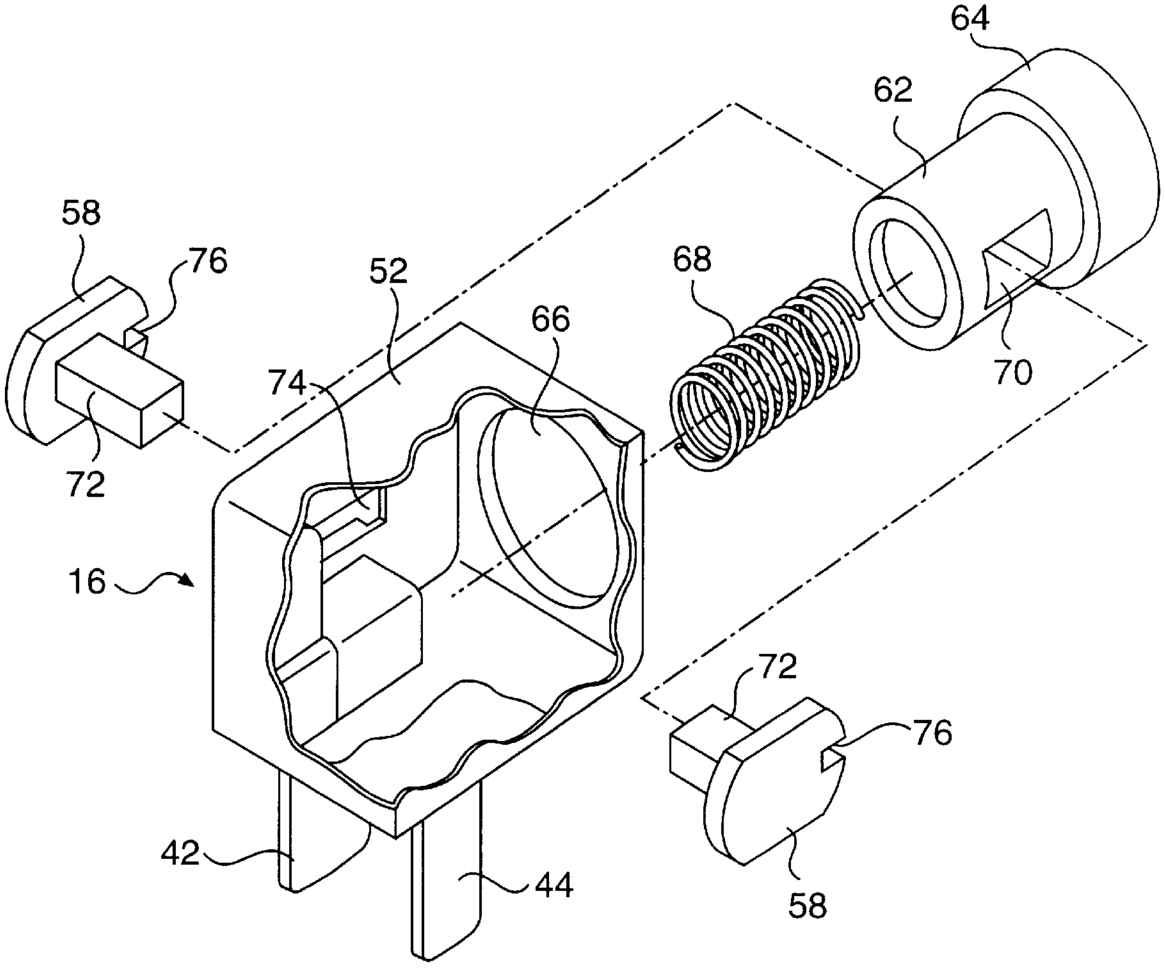
FIG. 4 is an exploded perspective view of the plug unit.

As shown in FIG. 4, the plug unit body 52 is hollow and contains the shaft 62 of a push button 64 which is received in an opening 66 in an end wall of the plug unit body 52. The push button 64 is biased outwardly of the plug unit body by a coil spring 68 seated in a recess in the end of shaft 62 and a similar recess in the opposite end wall of the body 52. The shaft 62 of the push button has a square cross-section passage 70 therethrough, opposite ends of which receive square cross-section shafts 72 of the locking plates 58. The shafts 72 (which are integral with the locking plates) extend through rectangular slots 74 in the sidewalls of the plug unit body, the slots permitting the locking plates to reciprocate between locking and unlocking positions.

Figure 5:
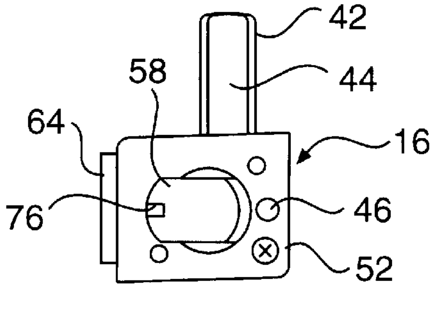
FIG. 5 is a side elevation view of the plug unit in the charging position.
Figure 6:
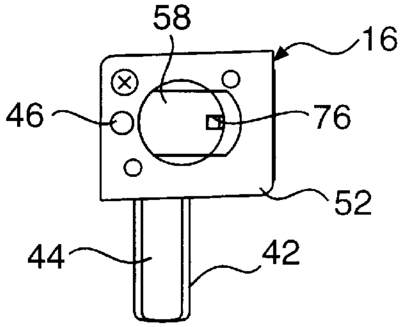
FIG. 6 is a side elevation of the plug unit in the non-charging position.
Figure 7:
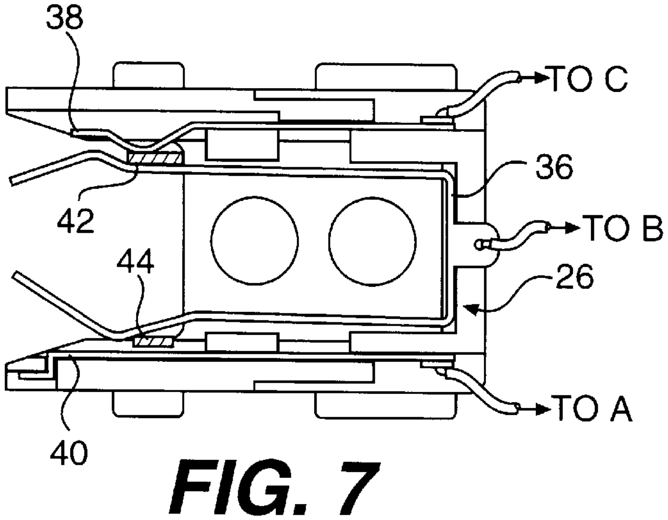
FIG. 7 is a plan view of a switch unit cooperating with blades of the plug unit when the plug unit is in the non-charging position.
Figure 8:
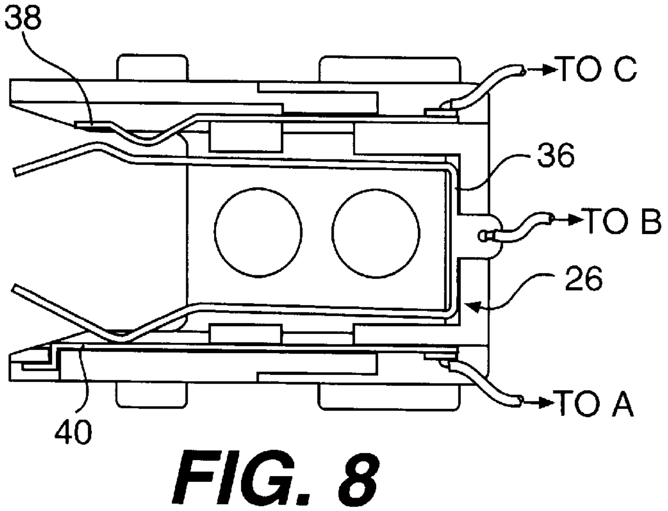
FIG. 8 is a plan view of the switch unit when the plug unit is in the charging position.
Figure 13:
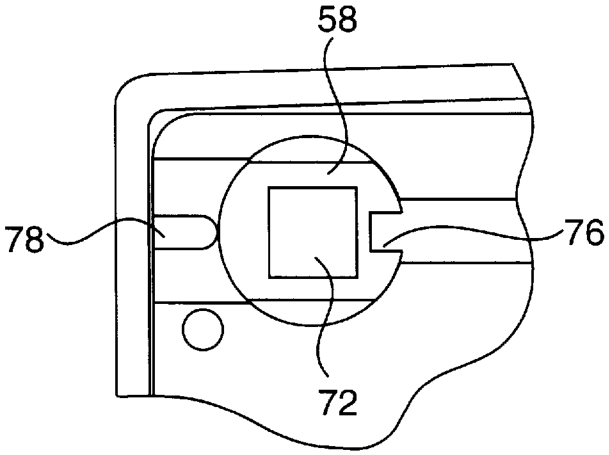
FIG. 13 is a fragmentary side elevation view showing the position of a locking plate of the plug unit, with relation to a corresponding wall of the plug unit box and a locking abutment when the plug unit is in the non-charging position.
Figure 14:
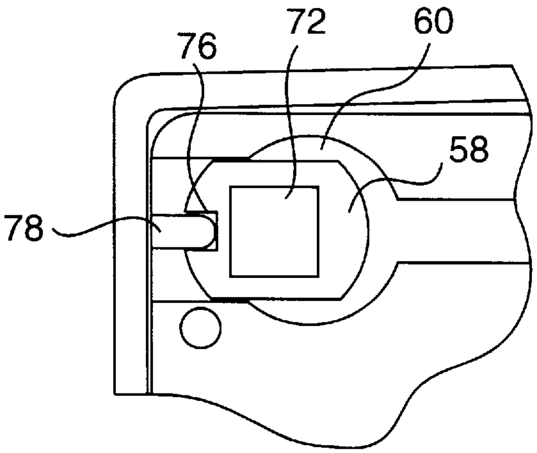
FIG. 14 is a similar fragmentary side elevation view showing the position of the locking plate, with relation to the wall of the plug unit box and the locking abutment when the plug unit is in the charging position.

Each locking plate has a notch 76 adapted to receive a corresponding locking abutment 78 formed on a sidewall surface 57 of the box 34. See FIGS. 12–14. When the push button 64 is projected outwardly of the body of the plug unit by the spring 68, as shown in FIGS. 5 and 10, the locking plates 58 move rearwardly so that the locking abutments 78 are received in the notches 76, locking the plug unit 16 in the charging position.

Before the plug unit can be turned from the charging position to the non-charging position, the push button 64 must be depressed to move the locking plates 58 forwardly, whereby the locking abutments 78 are withdrawn from the notches 76. Then, while the push button is held depressed to release the locking manually, the plug unit is turned so that the arcuate edges of the locking plates are retained within the arcuate depressions 60 of the sidewall surfaces 57 of the box 34 (see FIGS. 6, 9, and 13).

When the plug unit 16 is turned from the non-charging position and reaches the charging position, the locking plates are no longer retained within the confines of the arcuate depressions 60, and the spring 68 moves the locking plates and the push button 64 to their locking position. See FIGS. 5, 10, and 14.

As is apparent in FIGS. 1–6, 9 and 10, the body of the plug unit 16 is a block that is supported in the housing 12 between sidewalls of the housing for rotation about an axis transverse to the side walls. In moving between the charging and non-charging positions, the block rotates approximately 180° (see FIGS. 9 and 10). As is apparent in FIGS. 1 and 3, in either of the non-charging and charging positions of the block, surfaces of the block complement adjacent surfaces of the housing 12 and substantially close the space in which the block rotates.

While a preferred embodiment of the invention has been shown and described, it will be apparent to those skilled in the art that modifications can be made without departing from the principles and spirit of the invention, the scope of which is defined in the following claims.

The invention claimed is:

1. Apparatus in which a rechargeable battery is adapted to supply power to a load and to be charged from an AC source, comprising:

a load circuit;

a charging and indicating circuit;

a housing containing the load circuit and the charging and indicating circuit;

a plug unit having a pair of blades adapted to be inserted in an AC outlet, the plug unit being supported in the housing for movement between a non-charging position, in which the blades are retracted into the housing, and a charging position, in which the blades are projected from the housing for insertion in the AC outlet; and a switch unit in the housing cooperable with the plug unit and having a first switch position for connecting the battery to the load circuit when the plug unit is in the non-charging position and having a second switch position for disconnecting the battery from the load circuit and for connecting the battery to the charging and indicating circuit when the plug unit is in the charging position;

wherein the charging and indicating circuit includes a visual indicator that is energized repetitively when the plug unit is in the charging position and the blades are not supplied with power from the AC outlet, that is energized continuously when the plug unit is in the charging position and the blades are supplied with power from the AC outlet, and that is de-energized when the plug unit is in the non-charging position.

2. Apparatus according to claim 1, wherein the charging and indicating circuit includes a multivibrator having an output connected to the visual indicator and having an input connect to a source of bias voltage that is operative when the blades are supplied with power from the AC outlet, the multivibrator oscillating freely when the blades are projected from the housing but are not supplied with power from the AC outlet and being biased by said bias voltage to cease oscillating and to energize the visual indicator continuously when the blades are supplied with power from the AC outlet.

3. Apparatus according to claim 1, wherein the apparatus is a rechargeable flashlight having a bulb constituting the load.

4. Apparatus according to claim 1, wherein the switch unit has a common contact connected to the battery and has first and second contacts connected to the load circuit and the charging and indicating circuit, respectively, wherein one of the blades closes a normally open circuit between the common contact and the first contact and the other blade opens a normally closed circuit between the common contact and the second contact when the plug unit is in the non-charging position.

5. Apparatus comprising:

a housing containing a rechargeable battery, an AC plug unit having a pair of blades and being pivotally supported in the housing for movement between a non-charging position, in which the blades are retracted into the housing, and a charging position, in which the blades are projected from the housing for insertion into an AC outlet;

circuitry contained in the housing, including a pair of normally open switch contacts for controlling connection of the battery to a load circuit and a pair of normally closed switch contacts for controlling connection of the battery to a charging circuit;

wherein the switch contacts are positioned in relation to the plug unit so that when the blades are retracted into the housing, one of the blades provides a conductive connection between the normally open switch contacts and the other blade opens the normally closed switch contacts.

6. Apparatus according to claim 5, wherein the charging circuit has a pair of input terminals and the plug unit has a pair of contacts connected to the blades, respectively, and positioned on the plug unit relative to the input terminals so that when the plug unit is in the non-charging position, the contacts of the plug unit are disconnected from corresponding input terminals and when the plug unit is in the charging position the contacts of the plug unit are connected to the corresponding input terminals.

7. Apparatus according to claim 5, wherein the plug unit and the housing have cooperable lock parts which engage to hold the plug unit in the charging position and which are manually disengageable to permit the plug unit to be turned from the charging position to the non-charging position.

8. Apparatus according to claim 7, wherein the cooperable lock parts include a first lock part reciprocatively supported on the plug unit and a second lock part fixed to the housing, wherein the plug unit has a spring-biased push button thereon operatively connected to the first locking part, and wherein the first lock part is moved in one direction by the spring bias to engage the second lock part when the plug unit is moved to the charging position and is moved in the opposite direction to disengage the second lock part when the push button is depressed, whereby the plug unit may be moved away from the charging position and toward the non-charging position.

9. Apparatus according to claim 8, wherein the first lock part is supported on the plug unit between a pair of arcuate protrusions and has arcuate edges that complement the arcuate protrusions to provide a cylindrical pivot member when the push button is depressed, there being a pair of the pivot members at opposite sides of the plug unit, and wherein the housing has a pair of arcuate depressions which receive the pivot members, whereby the plug unit is pivotally supported on the housing.

10. Apparatus for pivotally supporting a body between a pair of walls for movement between a first position and a second position and for releasably locking the body at the second position, comprising:

a pair of arcuate depressions on the walls;

a pair of substantially cylindrical pivot members on opposite sides of the body received in the arcuate depressions, respectively, each of the pivot members comprising a pair of protrusions having substantially parallel inwardly facing edges and a pair of arcuate outwardly facing edges;

a locking plate positioned between each pair of protrusions and having a pair of parallel edges adjacent to the parallel edges of the protrusions for guiding the locking plate between a locking position and an unlocking position and having a pair of opposite arcuate edges which complement the arcuate edges of the protrusions to constitute a substantially cylindrical pivot member when the locking plate is in the unlocking position;

wherein the body has a push button reciprocatively supported thereon and biased outwardly by a spring, the push button being operatively connected to the locking plates whereby the locking plates are biased toward the locking position, the locking plates having locking elements adapted to engage cooperative fixed locking elements when the body is moved to the locking position.

11. Apparatus in which a rechargeable battery is adapted to supply power to a load and to be charged from an AC source, comprising:

a load circuit;

a charging circuit;

a switch unit having a first switch position for connecting the battery to the load circuit and a second switch position for disconnecting the battery from the load circuit and connecting the battery to the charging circuit; and an indicator connected to the switch unit and the charging circuit;

wherein the indicator has three different indicating conditions, including a first indicating condition when the switch unit connects the battery to the load circuit, a second indicating condition when the switch unit connects the battery to the charging circuit and the charging circuit is not charging the battery, and a third indicating condition when the switch unit connects the battery to the charging circuit and the charging circuit is charging the battery.

12. Apparatus according to claim 11, wherein the indicator is a light emitting indicator which does not emit light in the first condition, which emits light repetitively in the second condition, and which emits light continuously in the third condition.

13. Apparatus according claim 12, wherein the indicator is part of an indicating circuit which is powered by the battery to energize the indicator repetitively in the second condition and which is powered by the charging circuit to energize the indicator continuously in the third condition.

14. Apparatus comprising a housing containing a rechargeable battery and a charging circuit for charging the battery, and having a plug unit comprising a block supported between side walls of the housing for rotation about an axis transverse to the side walls, the block having a pair of blades extending therefrom and being rotatable between a non-charging position, in which the blades are retracted into the housing and a charging position in which the blades are projected from the housing for insertion into an AC outlet, the plug unit having contacts that are connected to terminals of the charging circuit when the block is in the charging position, the block having outer surfaces that complement adjacent surfaces of the housing when the block is in either of the charging and non-charging positions, so that a space in which the block rotates is substantially closed by the surfaces of the block.

15. Apparatus according to claim 14, wherein the plug unit has a locking device which retains the block in the charging position and which must be released manually to permit the block to rotate to the non-charging position.

16. Apparatus according to claim 15, wherein the block rotates by approximately 180° in moving between the charging and non-charging positions.

17. Apparatus according to claim 15, wherein the locking device has a release member disposed on the block outside the housing when the block is in the charging position.

18. Apparatus according to claim 14, wherein the contacts are disconnected from the terminals of the charging circuit when the block is in the non-charging position.

19. Apparatus according to claim 14, wherein the housing is part of a rechargeable flashlight and has a front end and a rear end, wherein a bulb unit is supported on the front end and the plug unit is supported on the rear end, and wherein the blades turn into and out of the housing through corresponding slots in a rear wall of the housing.

* * * * *